(No Model.)
M. H. MURPHY.
FRUIT PICKER.
No. 362,650. Patented May 10, 1887.
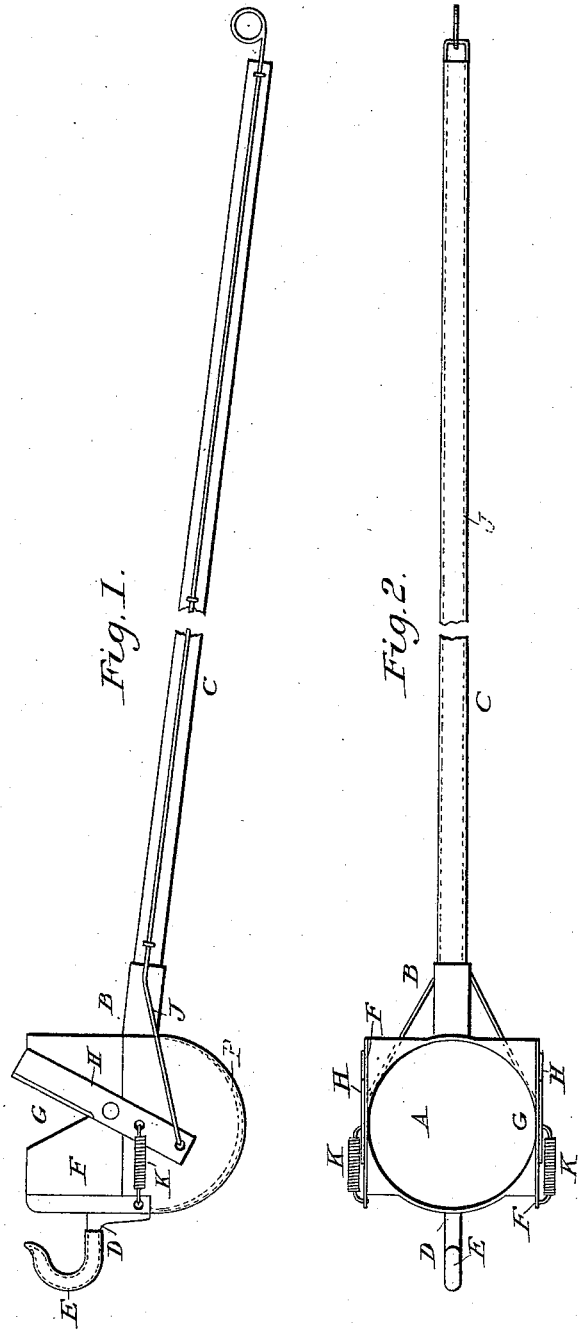
Witnesses:
A. W. Bryant
Howard Ferguson
Inventor.
Matthew H. Murphy
N. PETERS, Photo-Lithographer, Washington, D. C.

UNITED STATES PATENT OFFICE.

MATTHEW H. MURPHY, OF PORTLAND, OREGON.

FRUIT-PICKER.

SPECIFICATION forming part of Letters Patent No. 362,650, dated May 10, 1887.

Application filed June 27, 1885. Serial No. 170,041. (No model.)

*To all whom it may concern:*

Be it known that I, MATTHEW H. MURPHY, of Portland, in the county of Multnomah and State of Oregon, have invented a new and Improved Fruit-Picker, of which the following is a full, clear, and exact description.

The object of my invention is to provide a new and improved fruit-picker, by means of which the stem can be cut while the fruit rests in a receptacle lined inside with cotton plush or other soft material to prevent the fruit being bruised, as is invariably the case when the fruit, after the stem is cut, falls into a receptacle of any kind—either a metal dish, sack, net, or tube—as the least bruise spoils fruit for shipping.

The invention consists in the combination, with a cup, of a pole on the end of which the cup is held, and of blades on the opposite sides of the cup, which blades are actuated by rods on the pole.

Reference is to be had to the accompanying drawings, forming a part of this specification, in which similar letters of reference indicate corresponding parts in both the figures.

Figure 1 is a side view of my improved fruit-picker, parts being broken out. Fig. 2 is a plan view of the same, parts being broken out.

The cup A is made of metal or any other suitable material lined with cotton plush or other soft material, and is provided with a socket, B, for receiving the end of a pole, C. On the opposite side of the cup a hook, D, is secured, which is covered with rubber E, to prevent its cutting or bruising the limbs.

Upwardly-projecting plates F are secured on opposite sides of the cup, and are provided with V-shaped recesses G.

Blades H are pivoted on the outside of the plates F, and have their lower ends connected with rods J, guided by eyes or staples on the pole C, and extending to the end of the same. These blades are arranged on opposite sides of the cup, the object of this arrangement being to enable the operator to cut off the fruit on either the right-hand or left-hand side of a limb.

Springs K are secured to the plates F and to the blades H below the pivots, and act to swing the blades in a direction the reverse to that in which they swing when pulled by rods J. In using the fruit-picker the hook E is hooked over a branch in such a manner that the fruit is in the cup A, lined with cotton plush or other soft material, and the stem of the fruit, or the twig on which the fruit hangs, is in one of the recesses G. By pulling the rod J the blades H are swung in the direction of the stem, and one of them will thus separate the fruit from the twig while resting in the cup which is lined with cotton plush, thereby preventing the fruit from being bruised.

Having thus fully described my invention, I claim as new and desire to secure by Letters Patent—

1. In a fruit-picker, the combination of the cup A, the plates F, having recesses G, the hook D, secured to said cup, the pole C, and the pivoted blades H, substantially as described.

2. In a fruit-picker, the combination of the cup A, lined with plush, the hook D, attached to said cup, the plates F, having recesses G, the pivoted blades H, springs K, pole C, and the rods J, for operating blades H, all arranged substantially as described.

MATTHEW H. MURPHY.

Witnesses:
HARRY STANFORD,
J. W. NELSON.